(12) United States Patent
Hochwald et al.

(10) Patent No.: US 6,327,310 B1
(45) Date of Patent: Dec. 4, 2001

(54) WIRELESS TRANSMISSION METHOD FOR ANTENNA ARRAYS, HAVING IMPROVED RESISTANCE TO FADING

(75) Inventors: Bertrand M. Hochwald, Springfield; Thomas Louis Marzetta, Summit, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/134,297

(22) Filed: Aug. 14, 1998

(51) Int. Cl.$^7$ ................................................. H04L 27/00
(52) U.S. Cl. ..................... 375/259; 375/267; 375/346; 375/347
(58) Field of Search ................................. 375/259, 346, 375/347, 354, 265, 267; 370/310

(56) References Cited

U.S. PATENT DOCUMENTS

| | | | |
|---|---|---|---|
| 6,088,408 | * | 7/2000 | Calderbank et al. ................. 375/347 |
| 6,097,771 | * | 8/2000 | Foschini ............................... 375/346 |

FOREIGN PATENT DOCUMENTS 0817401    1/1998   (EP) .

OTHER PUBLICATIONS

Naguib, A.F.; Seshadri, N.; Claderbank, A.R. "Applications of space–time block codes and interference . . . " Signals, Systems & Computers, 1998 Conf. Rec. of the 32nd Asilomar Conf. on, 1998 pp. 1803–1810 vol.2.*

Calderbank, A.R.; Seshadri, N.; Tarokh, V. "Space–time codes for wireless communication" Information Theory. Proceedings, 1997 IEEE International Symposium on, 1997, pp. 146.*

Naguib, A.F.; Tarokh, V.; Seshadri, N.; Calderbank, A.R. "Space–time coded modulation for high data rate wireless communications" Global Telecomm. Conf., 1997. GLOBECOM '97, IEEE, 1997, pp. 102–109 vol. 1.*

Tarokh, V.; Naguib, A.F.; Seshadri, N.; Calderbank, A.R. "Space–time codes for high data rate wireless communication: mismatch analysis" Communications, ICC '97 Montreal, IEEE Int. Conf. on, 1997, pp. 309–313 vol.1.*

Lo, Y.V., "On a statistical space–time modulation theory", IEEE Pacific RIM Conf. On Communications, Computers and Signal Processing, pp. 584–589 (1989).

Marzetta, T.L. et al., Fundamental limitations on multiple–antenna wireless links in Rayleigh fading, Proceedings of the 1998 IEEE International Symposium on Information Theory, p. 310 (1998).

Hochwald, N.M. et al., Unitary space–time modulation for multiple–antenna communications in Rayleigh flat fading, IEEE Transactions on Information Theory, pp. 543–564 (2000).

* cited by examiner

*Primary Examiner*—Stephen Chin
*Assistant Examiner*—Shuwang Liu
(74) *Attorney, Agent, or Firm*—Martin I. Finston

(57) ABSTRACT

Disclosed is a modulation method for wireless signal transmission. Each message that is transmitted is made up of a sequence of signals, each selected from a constellation of L such signals, L a positive integer. Each transmitted signal is distributed spatially across a transmitting antenna array, and is also distributed in time. Thus, each signal may be represented as a T×M matrix, in which each of the M columns represents a distinct antenna of the array, and each of the T rows represents a distinct time interval. Each entry in this matrix represents a complex baseband voltage amplitude. Each of these signal matrices is proportional to a matrix having orthonormal columns.

18 Claims, 2 Drawing Sheets

WIRELESS TRANSMISSION METHOD FOR ANTENNA ARRAYS, HAVING IMPROVED RESISTANCE TO FADING

FIELD OF THE INVENTION

This invention relates to modulation methods for wireless signal transmission. More particularly, the invention relates to modulation methods that reduce the error rates of received signals in fading environments and that enable data rates to be increased without the need to increase bandwidth or transmitted power. Still more particularly, the invention relates to such methods in conjunction with the use of multiple antenna arrays.

BACKGROUND OF THE INVENTION

It is generally desirable to reduce error rates, and to increase channel capacity, in wireless transmission systems. Multiple-antenna arrays can be used to achieve these desirable effects.

Fading is one of several physical phenomena that tend to increase error rates, or to reduce channel capacity, in wireless transmission systems. Fading is the result of destructive interference, at the receiver, between correlated signal portions that because of scattering have arrived over different-length paths.

One technique that tends to mitigate the effects of fading is differential phase modulation, in which phase differences carry transmitted information. Although differential phase modulation is a known technique for single-antenna transmission and reception in fading environments, there are no known adaptations of this technique for use with multiple-antenna arrays.

However, in certain fading environments, the theoretical capacity of a multiple-antenna communication link increases linearly with the size of the transmitter or receiver array, this effect being determined by the array having the lesser number of antennas. This effect has been predicted for rich scattering environments in which fading is "flat." That is, the propagation coefficients that describe the effect of the physical transmission channel on the transmitted signal are approximately independent of frequency over the signal bandwidth. Flat fading can be achieved in practice for a particular environment if the bandwidth is not too great, or if it is restricted appropriately.

Significantly, such a linear increase in capacity occurs only if the propagation coefficients between all pairs of transmitter and receiver antennas are known to the receiver. In practice, this condition can be met only if the receiver is trained, from time to time, by receiving known training signals from the transmitter.

Communication methods that use such a training procedure are described, for example, in the co-pending U.S. patent application Ser. No. 08/938,168, commonly assigned herewith, filed on Sep. 26, 1997 by B. M. Hochwald et al. under the title, "Multiple Antenna Communication System and Method Thereof."

Other co-pending patent applications, commonly assigned herewith, that describe related subject matter are Ser. No. 08/673,981, filed on Jul. 1, 1996 by G. J. Foschini under the title "Wireless Communications System Having a Layered Space-Time Architecture Employing Multi-Element Antennas," Ser. No. 09/060,657, filed on Apr. 15, 1998 by G. J. Foschini and G. D. Golden under the title "Wireless Communications System Having a Space-Time Architecture Employing Multi-Element Antennas at Both the Transmitter and Receiver," and a patent application filed on Jul. 10, 1998 by T. L. Marzetta under the title "Determining Channel Characteristics in a Space-Time Architecture Wireless Communication System Having Multi-Element Antennas."

Unfortunately, training intervals cut into the available time during which data may be transmitted. The length of this interval increases as the number of transmitter antennas is increased. Moreover, the propagation coefficients can be treated as constant only over an average period of time referred to as the fading coherence interval. To be effective, training should be repeated at least once per such interval. However, fading is very rapid in some environments, such as those in which a mobile station is operating within a rapidly moving vehicle. For rapid fading environments, the time between fades may be too short for the communication system to learn the propagation coefficients belonging to even one transmitting antenna, much less those of a multiple antenna array.

Thus, until now, the theoretical benefits of multiple antenna arrays in fading environments have eluded full practical realization. As a consequence, there has remained a need to further improve the channel capacity and error rates achieved with such arrays, without requiring knowledge of the propagation coefficients.

SUMMARY OF THE INVENTION

We have found a new and useful modulation method. Signals transmitted and received according to our method are robust against fading, as well as against receiver-induced noise, in flat fading environments. Our method does not require knowledge of the propagation coefficients, although in some implementations of our method, such knowledge can be used to further improve performance. Our method will be useful, inter alia, in connection with the use of multiple antenna arrays for improving error rates in transmitted and received signals.

In accordance with our method, each message that is transmitted is made up of a sequence of signals, each selected from a constellation of L such signals, L a positive integer. Thus, each transmitted signal embodies a number of bits given by log L. (Herein, "log" denotes the logarithm to the base 2.)

Each transmitted signal is distributed spatially across the transmitting array, and is also distributed in time. That is, each signal occupies T successive time units, which we refer to as symbol intervals. The length (in, e.g., microseconds) of a symbol interval is determined by the bandwidth of the communication system, which is well known to be a matter of system design.

At each discrete time value $t=1, 2, \ldots, T$, a respective vector of complex amplitudes defines the baseband voltage to be placed on a carrier and transmitted. Letting the positive integer M ($M \geq 1$) represent the number of transmitting antennas, this vector has M entries, each representing the complex baseband voltage amplitude at a respective one of the transmitting antennas.

We refer to such a vector as a symbol. Thus, each transmitted signal may be regarded as a sequence of T symbols. Alternatively, each transmitted signal may be regarded as a collection of M vectors in time, each of length T, and each associated with a respective transmitting antenna. Both of these views flow directly from the representation of each transmitted signal as proportional to a T×M matrix $\Phi^l$, where the index l runs over the signal constellation: $l=1, 2, \ldots, L$. In such a representation, each of the T rows is a respective symbol, and each of the M columns is one of the vectors in time.

In accordance with the invention, all of the columns of each matrix $\Phi^l$ are orthonormal. The baseband signals provided to the transmitting array are represented by respective matrices $S^l$, which are related to the matrices $\Phi^l$ by $S^l = \sqrt{TP}\Phi^l$, where P is the average power fed into each antenna.

Thus, in one aspect, the invention involves a method for wireless communication, comprising transmitting at least one signal from one transmitting antenna or from an array of two or more transmitting antennas. (Thus, $M \geq 1$.) (The term "array" will be used herein to collectively designate the transmitting antennas even if there is, in fact, only one transmitting antenna.) Each signal to be transmitted is selected from a constellation of known signals. The baseband amplitude of each of these signals is distributed across the antennas of the transmitting array according to the signal matrix S described above.

The transmitted message may be received by a single receiving antenna, or it may be received by an array of N receiving antennas, in which the integer N may be greater than, equal to, or less than M. The received baseband amplitudes can be tabulated as a T×N matrix X, in which, as above, the row index increases in discrete time, and the column index varies across the antennas of the (receiving) array. (In the case of a single receiving antenna, N=1.)

The received signal may differ in dimensionality from the transmitted signal. Moreover, the received signal will generally show the effects of uncertainty contributed by the propagation coefficients and the additive receiver noise. Therefore, it is advantageous to use a decision process at the receiving end to restore the transmitted signal.

The decision processes known in the art as "maximum likelihood (ML) receivers," are useful in this regard. A ML receiver functions by selecting that candidate signal that maximizes the likelihood of observing the signal X actually received. A second decision process, also known in the art, is a maximum a posteriori probability (MAP) receiver. If all of the candidate signals are equally likely, the ML and MAP receivers are equivalent. If the candidate signals are not equally likely, it is advantageous to employ the MAP receiver, which is readily achieved through a simple and well-known modification to the ML receiver.

Accordingly, in one aspect, the invention involves a method for wireless communication, comprising receiving at least one signal from an array of one or more transmitting antennas. Each such signal is transmitted as a selection from a constellation of known signals, each representable as a matrix as explained above. For each received signal, a score is computed for each of the known signals, in accordance with a decision process. The received signal is then identified with that one of the known signals that yields the greatest score.

DETAILED DESCRIPTION

Figure 1:
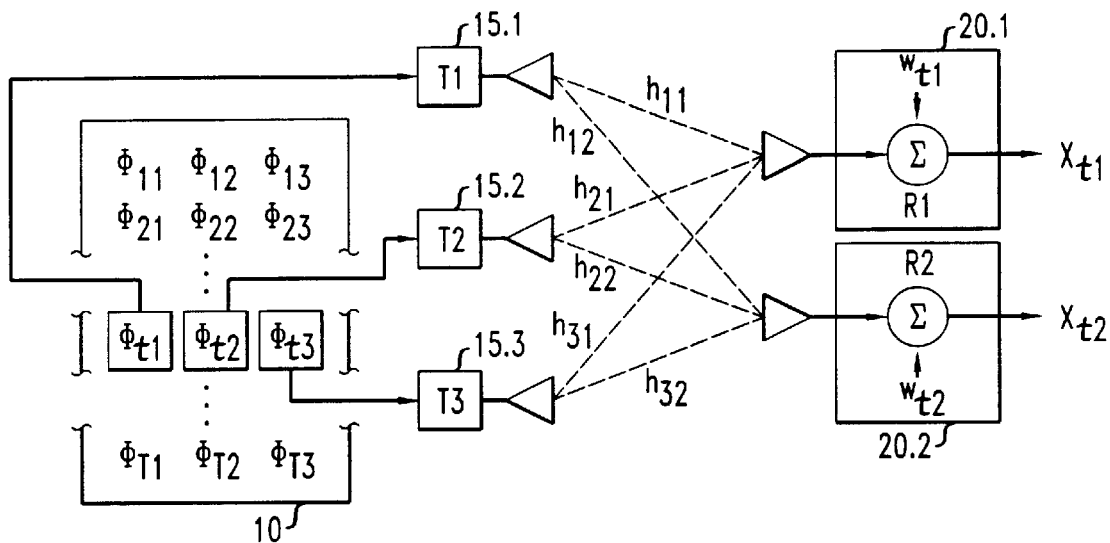
FIG. 1 is a schematic block diagram of a communication system for transmitting and receiving signals in accordance with the invention.

FIG. 1 shows a baseband signal 10 input to a transmitting array of antennas 15.1–15.3, and transmitted to a receiving array of antennas 20.1, 20.2. Thus, in the communication system shown, M=3 and N=2. It should be noted that although one array is identified here as transmitting and the other as receiving, the principles of the invention will apply to bidirectional as well as to unidirectional communication systems. The physical transmission channel between the transmitting and receiving antennas is characterized by a set of MN propagation coefficients $h_{ij}$, i=1, ..., M, j=1, ..., N, each a complex scalar characterizing the response at receiving antenna j due to transmissions from transmitting antenna i.

At each value t of discrete time, t=1, ..., T, one of the rows of the signal matrix is input to the transmitting array. FIG. 1 shows the t'th such row being input, with each entry in the row input to a respective one of antennas 15.1–15.3. Each entry of the signal matrix represents a complex-valued baseband voltage level which, for transmission, is modulated onto the carrier frequency according to known methods.

At each receiving antenna 20.1, 20.2, the antenna response is amplified and demodulated to baseband according to known methods. Receiver noise, which is here assumed to be statistically independent among the N receivers and T symbol periods, is represented in the figure as a component $w_{t1}$ added to the output of antenna 20.1 and a component $w_{t2}$ added to the output of antenna 20.2 at each time t. After demodulation to baseband, the output of the antenna array at time t is $X_{tn}$, where n=1 for antenna 20.1 and n=2 for antenna 20.2. In vector notation, the response $X_t$ of the receiving array to the t'th row $S_t$ of transmitted signal matrix S (the index l is suppressed here) is given by $X_t = S_t H + w_t$. If H can be treated as constant during the time period T, then over that period, the response of the receiver array is given by X=S H+W, where W is a T×N matrix whose t,n entry represents the additive noise at time t and receiver n.

An important consideration in any method of message transmission is capacity; that is, the amount of information that can be reliably transmitted per unit time in a communication channel. We define a channel use as one block of T transmitted symbols (i.e., one transmitted signal matrix). We measure the channel capacity in bits per channel use. Data can be transmitted reliably at any rate less than the channel capacity. Thus, the channel capacity limits the number of bits per signal, or log L.

As noted, the coherence interval is the length of time over which the propagation coefficients can be regarded as approximately constant. In the following discussion, the symbol $\tau$ will represent coherence interval.

The number T of symbols per signal should not exceed $\tau$, because if it does, fading effects will tend to corrupt the received signal, and the advantages achievable with our method will be reduced. However, if T is substantially less than $\tau$, the channel will be used inefficiently, which might lead to a greater error rate. Therefore, it will generally be advantageous for T to be equal, or nearly equal, to $\tau$.

We performed a theoretical analysis of channel capacity achievable with our method, in a fading environment and in the presence of additive receiver noise. For modeling purposes, we made the assumption that fading is flat, i.e., independent of frequency, and that the fading coefficients are constant over intervals of length $\tau$. As noted, the first of these assumptions is valid provided the bandwidth is not too great.

This condition will be satisfied for many practical transmission systems. The second assumption is a reasonable one, inter alia, for many TDMA, frequency hopping, and interleaved systems.

We also assumed that the values of the propagation coefficients $h_{mn}$ are identically distributed and statistically independent. We assumed further that the magnitudes of the (complex) propagation coefficients are proportional to Rayleigh distributed random variables, and that their phases are uniformly distributed from 0 to $2\pi$ radians. (Those skilled in the art will understand from this that the real and imaginary parts of the propagation coefficients are zero-mean, independent, identically distributed, Gaussian random variables.)

From our theoretical analysis, we found that increasing the number M of transmitting antennas beyond $\tau$ does not increase the channel capacity. In this context, $\tau$ is measured in discrete time; i.e., in symbol intervals.

Moreover, our model predicts two conditions under which the transmission rate obtainable using signals constructed according to our invention can reach the information-theoretic channel capacity.

One of these conditions is that T>>M. The other condition is simply that T>M, but only if the signal-to-noise ratio is high. These conditions are independent; good performance is predicted under either of these conditions alone.

The significance of this prediction is that the signals that we describe here have no properties that make them, in a fundamental sense, less efficient than any other signals.

As noted above, increasing the number N of receiving antennas is useful for increasing the channel capacity, as will be understood by those skilled in the art.

As mentioned above, it is advantageous to employ a decision process such as a ML receiver to infer, from the received signal X, the particular signal matrix $\Phi^l$ that was transmitted. This procedure comprises calculating the conditional probability $p(X|\Phi^l)$ of receiving this particular X, given that the transmitted signal matrix was each of the $\Phi^l$ in turn. The $\Phi^l$ that yields the greatest value of this conditional probability is identified as the transmitted signal. This "maximum likelihood signal" $\Phi^{ML}$ is symbolically represented as the argument of a maximization procedure by the expression $$\Phi^{ML} = \underset{l}{\mathrm{argmax}}\ p(X|\Phi^l).$$

When the propagation coefficients are Rayleigh distributed, the maximum likelihood signal can be evaluated by maximizing a particularly simple expression, because $$\underset{l}{\mathrm{argmax}}\ p(X|\Phi^l) = \underset{l}{\mathrm{argmax}} \sum_{m=1}^{M}\sum_{n=1}^{N}|\underline{\Phi_m^{l*}}\underline{X_n}|^2.$$

In the double-sum expression, the quantity within the vertical bars is the vector dot product between the complex conjugate of the m'th column of $\Phi^l$, and the n'th column of X. (The symbol * denotes the conjugate transpose of a vector or matrix. The underscore beneath the factors within the vertical bars denotes that these quantities are column vectors.) The relevant computation is readily made by a digital computer under the control of an appropriate program, and, as those skilled in the art will recognize, it is particularly suited for rapid calculation by a parallel processor.

In our theoretical model, we have been able to find a convenient upper bound, referred to as a Chernoff upper bound, for the two-signal error probability; i.e., for the probability of error given two signals $\Phi^l$, $\Phi^{l'}$ transmitted with equal probability. We found that this bound depends only on M, T, N, the signal-to-noise ratio p, and on the M quantities $d_m$ that are the singular values of the M×M matrix $\Phi^{l*}\Phi^{l'}$.

The "singular values" are understood as follows. It is a basic result from linear algebra that any matrix can be factored into the product ABC* , in which A and C are unitary matrices, and B (not necessarily a square matrix) has the following properties: all non-diagonal entries are 0, all diagonal entries are real and non-negative, and the diagonal entries occur in decreasing order. The diagonal entries are the singular values of the original matrix.

Broadly speaking, the singular values of $\Phi^{l*}\Phi^{l'}$ it are a measure of the similarity of the sub-spaces spanned by the columns of the respective matrices. That is, linear combinations of the M columns of the unprimed matrix generate an M-subspace of T-dimensional space. Similarly, linear combinations of the M columns of the primed matrix generate a different M-subspace of T-dimensional space. For distinct transmitted signals to be discriminated readily and with high assurance, these respective subspaces should be, in a certain mathematical sense, as dissimilar as possible. The smaller the singular values, the greater this dissimilarity. Thus, decreasing any given singular value (with, e.g., the others held constant) will tend to decrease the probability of error in decoding the received signal. Methods for obtaining the singular values of a matrix are well known, and need not be described here.

The Chernoff upper bound C.U.B. is expressed by $$C.U.B. = \frac{1}{2}\prod_{m=1}^{M}\frac{1}{\left[1+\frac{\left(\frac{\rho T}{M}\right)^2(1-d_m^2)}{4\left(1+\frac{\rho T}{M}\right)}\right]^N},$$

where $\rho$ represents the signal-to-noise ratio (in units of power/power), and the other symbols are as defined above. According to our theoretical model, the two-signal error probability will never be greater than this quantity. For a given signal-to-noise ratio and a given set of choices for T and M, this quantity depends upon the singular values $d_m$.

The C.U.B., and thus the maximum possible error probability, is minimized when all of the singular values are driven as low as possible, preferably to zero. However, it will not generally be possible to drive more than a few, if indeed any, of the singular values to zero, over all pairs of matrices $\Phi^l$, $\Phi^{l'}$. That is, all of the singular values will be zero only if all M columns of each signal matrix of the signal constellation are orthogonal to all M columns of every other matrix in the constellation. This would call for a total of L×M mutually orthogonal columns. However, because the length of each of these columns is T, the total number of mutually orthogonal columns can never be greater than T. Although, as noted, it is desirable for T to be greater than M, it will nevertheless often be the case that T is less than the product L×M. Therefore, the design of signal constellations will in many cases be aimed at producing a set of singular values that, according to an appropriate measure, are cumulatively as small as possible.

When there is a single transmission antenna (M=1), each of the L signal matrices $\Phi^l$ is a complex unit vector having T components. In that case, the problem of minimizing the singular values is equivalent to minimizing the magnitudes of the respective inner products between all pairs of these vectors (excluding the pairing of any vector with itself). The largest of these magnitudes, here denoted $d_{max}$, is a measure of the maximum pairwise correlation between distinct signals. A lower bound for $d_{max}$ is readily derived from the following known mathematical result, in which k is a non-negative, integer-valued, free parameter:

$$L \le \frac{1-d_{max}^2}{k+1-(T+k)d_{max}^2} \cdot \frac{T(T+1)\cdots(T+k)}{k!}.$$

By way of example, if M=1, T=5, and L=32, this formula states that $d_{max}$ can be no less than 0.46. Thus, a minimization procedure would seek to make $d_{max}$ as close as possible to 0.46.

Figure 2:
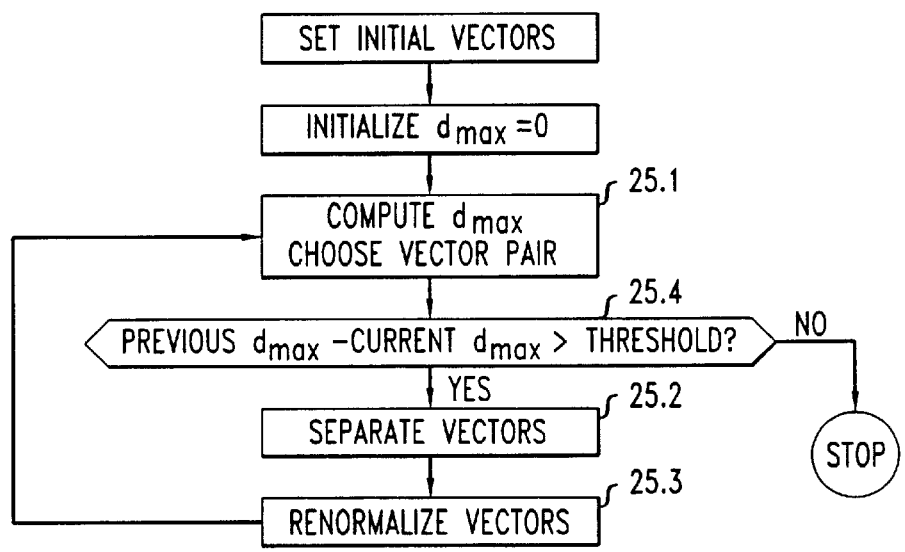
FIG. 2 is a flowchart of an illustrative algorithm for constructing signals useful for the practice of the invention in some embodiments.

For the case M=1, we have developed a simple iterative algorithm for reducing $d_{max}$, and thus for improving an intial signal constellation. With reference to FIG. 2, step 25.1 is to compute $d_{max}$, and to choose a pair of signal vectors having an inner product whose magnitude is $d_{max}$. Step 25.2 is to separate the vectors of this pair by shifting each of them a small amount in opposite directions along their difference vector. Step 25.3 is to renormalize the chosen vectors, if necessary. As shown at box 25.4, a test is performed to determine whether $d_{max}$ is still decreasing. (Exemplarily, this test ascertains whether the decrease from the last value to the current value of $d_{max}$ is greater than a threshold.) Steps 25.1–25.3 are repeated as long as $d_{max}$ is determined to be decreasing.

By applying this algorithm to a constellation of initially randomly generated unit vectors with T=5 and L=32 (one bit per channel use), we achieved a value of 0.515 for $d_{max}$, which is close to the lower bound 0.46, discussed above.

A useful constellation of signals with M=2 can be constructed from the column vectors that result from this algorithm by adjoining to each of these column vectors a second column vector constructed to be orthonormal to it.

EXAMPLE

We performed theoretical calculations to find out, inter alia, how the two-signal error probability depends on the signal-to-noise ratio p and on the correlation factors (i.e., the pertinent singular values).

Figure 3:
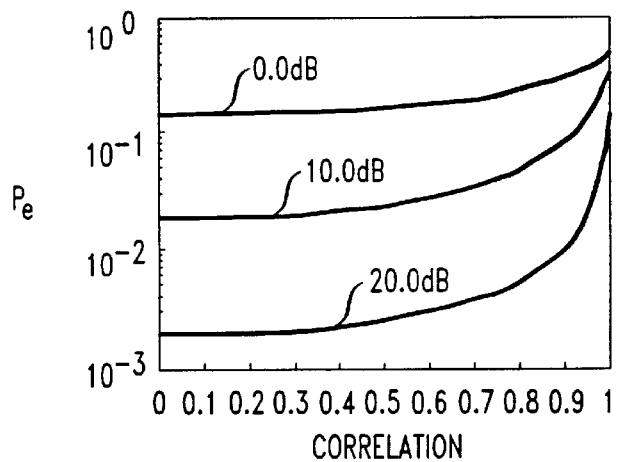
FIGS. 3–5 are graphs that were generated as the result of theoretical calculations. These graphs describe aspects of the performance of a communication system using the inventive method, under various conditions.

FIG. 3 shows the two-signal error probability as a function of the correlation factor d, for M=1, N=1, T=5. Three curves are shown, corresponding respectively to ρ=0.0 dB, ρ=10.0 dB, and ρ=20.0 dB. It is evident from the figure that relatively low values of the error probability are predicted when the correlation factor is less than about 0.8. Thus, $d_{max}$<0.8 defines a useful benchmark to which the signal constellation is advantageously designed.

Figure 4:
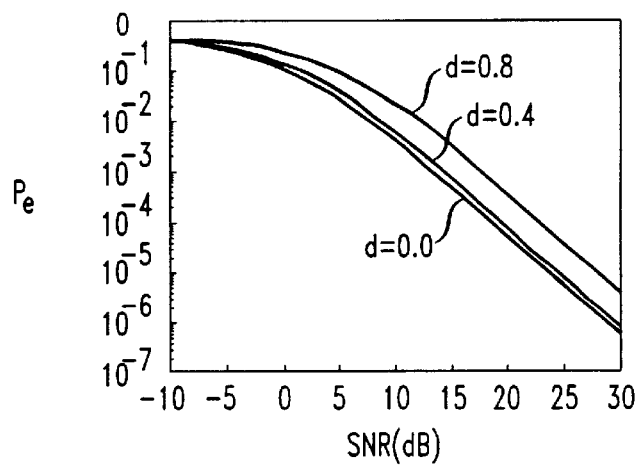

FIG. 4 shows the two-signal error probability as a function of p for M=2, N=1, T=5. The singular values $d_1$, $d_2$ are assumed to be equal (and are represented in the figure by the symbol d). Three curves are shown, corresponding respectively to d=0.8, d=0.4, and d=0.0.

Figure 5:
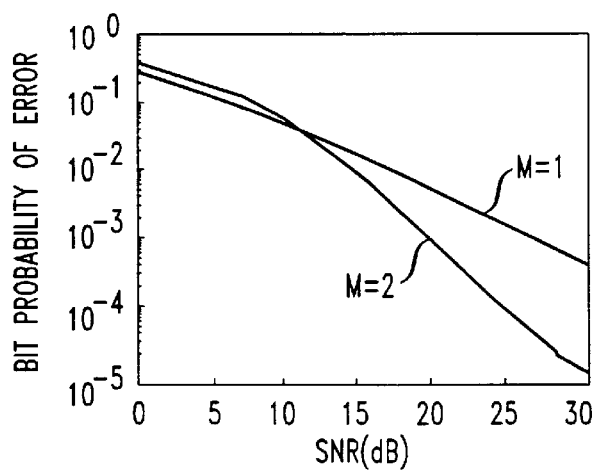

FIG. 5 is the result of a numerical simulation. This figure shows the bit probability of error as a function of p for N=1, T=5, and a data rate of 1 bit per channel use. A pair of curves is shown for the cases M=1 and M=2, respectively. It is evident from the figure that with a single transmission antenna, a 1% bit probability of error is predicted at a signal-to-noise ratio of about 20 dB, whereas the same bit probability of error is achieved at a signal-to-noise ratio of only 15 dB when two antennas are used. Thus, using a second antenna results in an effective gain of 5 dB. The total transmitted power is the same in either case.

The Appendix, below, lists the 32 signal matrices, denoted S(1)–S(32), used in our numerical simulations for the case M=2, T=5.

The invention claimed is:

1. A method of wireless communication, comprising: generating at least one baseband signal; and transmitting said signal, on a radiofrequency carrier, from an array of two or more transmission antennas, wherein:
   a) each said baseband signal is selected from a plurality of symbols, to be referred to as a constellation;
   b) each said baseband signal consists of a plurality of amplitudes to be distributed across the antenna array and to be distributed in discrete time;
   c) each symbol is equivalent to a matrix in which each column represents a distinct antenna of the array, and each row represents a distinct time interval; and
   d) the constellation is equivalent to a set of matrices in each of which all columns are orthonormal.

2. A method of wireless communication, comprising: generating at least one baseband signal; and transmitting said signal, on a radiofrequency carrier, from an array of one or more transmission antennas, wherein:
   a) each said baseband signal is selected from a plurality of symbols, to be referred to as a constellation;
   b) each said baseband signal consists of a plurality of amplitudes to be distributed across the antenna array and to be distributed in discrete time;
   c) each symbol is equivalent to a matrix in which each column represents a distinct antenna of the array, and each row represents a distinct time interval;
   d) any two matrices $\Phi_1$, $\Phi_2$ corresponding to respective signals of the signal constellation have a matrix product $\Phi_1 * \Phi_2$, wherein the symbol * denotes conjugate transposition;
   e) for all pairs of matrices in the constellation, every said matrix product has a set of one or more singular values; and
   f) the signals of the signal constellation are chosen in a manner that tends to collectively minimize the singular values.

3. The method of claim 1 or claim 2, wherein the number of time intervals occupied by each signal is greater than the number of transmission antennas.

4. The method of claim 2, wherein: there is a single transmission antenna; the constellation is equivalent to a set of matrices normalized such that all columns have unit magnitude; and under said normalization, the singular values are less than 0.8.

5. The method of claim 2, wherein the number of transmission antennas is two or more, and the constellation is equivalent to a said of matrices each of which consists of orthonormal columns.

6. A method of wireless communication, comprising: generating at least one baseband signal; and transmitting said signal, on a radiofrequency carrier, from an array of one or more transmission antennas, wherein:
   a) each said baseband signal is selected from a plurality of symbols, to be referred to as a constellation;
   b) each said baseband signal consists of a plurality of amplitudes to be distributed across the antenna array and to be distributed in discrete time;
   c) each symbol is equivalent to a matrix in which each column represents a distinct antenna of the array, and each row represents a distinct time interval;

d) any two matrices $\Phi_1$, $\Phi_2$ corresponding to respective signals of the signal constellation have a matrix product $\Phi_1^*\Phi_2$, wherein the symbol * denotes conjugate transposition;

e) for all pairs of matrices in the constellation, every said matrix product has a set of one or more singular values;

f) the constellation is equivalent to a set of matrices normalized such that all columns have unit magnitude; and g) under said normalization, the singular values are all less than 0.8.

7. The method of claim 6, wherein the number of transmission antennas is two or more, and the constellation is equivalent to said set of matrices each of which consists of orthonormal columns.

8. A method of wireless communication, comprising: receiving, at one or more receiving antennas, at least one radiofrequency signal from an array of two or more transmission antennas; demodulating the received signal to obtain therefrom a baseband signal; and subjecting the baseband signal to a decision process, thereby to recover a transmitted signal from the baseband signal, wherein:

a) the decision process comprises computing a score for each of a plurality of candidate symbols, said plurality to be referred to as a constellation, and identifying, as the transmitted signal, that candidate signal which yields the best score;

b) each candidate signal consists of a plurality of amplitudes to be distributed across the transmission antenna array and to be distributed in discrete time;

c) each candidate signal is equivalent to a matrix in which each column represents a distinct antenna of the transmission array, and each row represents a distinct time interval; and d) the constellation is equivalent to a set of matrices in each of which all columns are orthonormal.

9. A method of wireless communication, comprising: receiving, at one or more receiving antennas, at least one radiofrequency signal from an array of one or more transmission antennas; demodulating the received signal to obtain therefrom a baseband signal; and subjecting the baseband signal to a decision process, thereby to recover a transmitted signal from the baseband signal, wherein:

a) the decision process comprises computing a score for each of a plurality of candidate symbols, said plurality to be referred to as a constellation, and identifying, as the transmitted signal, that candidate signal which yields the best score;

b) each candidate signal consists of a plurality of amplitudes to be distributed across the transmission antenna array and to be distributed in discrete time;

c) each candidate signal is equivalent to a matrix in which each column represents a distinct antenna of the transmission array, and each row represents a distinct time interval;

d) any two matrices $\Phi_1,\Phi_2$ corresponding to respective signals of the signal constellation have a matrix product $\Phi_1^*\Phi_2$, wherein the symbol * denotes conjugate transposition;

e) for all pairs of matrices in the constellation, every said matrix product has a set of one or more singular values; and f) the signals of the signal constellation are chosen in a manner that tends to collectively minimize the singular values.

10. The method of claim 8 or claim 9, wherein the number of time intervals occupied by each candidate signal is greater than the number of transmission antennas.

11. The method of claim 9, wherein: there is a single transmission antenna; the constellation is equivalent to a set of matrices normalized such that all columns have unit magnitude; and under said normalization, the singular values are less than 0.8.

12. The method of claim 9, wherein the number of transmission antennas is two or more, and each matrix in the constellation consists of orthonormal columns.

13. A method of wireless communication, comprising: receiving, at one or more receiving antennas, at least one radiofrequency signal from an array of one or more transmission antennas; demodulating the received signal to obtain therefrom a baseband signal; and subjecting the baseband signal to a decision process, thereby to recover a transmitted signal from the baseband signal, wherein:

a) the decision process comprises computing a score for each of a plurality of candidate symbols, said plurality to be referred to as a constellation, and identifying, as the transmitted signal, that candidate signal which yields the best score;

b) each candidate signal consists of a plurality of amplitudes to be distributed across the transmission antenna array and to be distributed in discrete time;

c) each candidate signal is equivalent to a matrix in which each column represents a distinct antenna of the transmission array, and each row represents a distinct time interval;

d) any two matrices $\Phi_1$, $\Phi_2$ corresponding to respective signals of the signal constellation have a matrix product $\Phi_1^* \Phi_2$, wherein the symbol * denotes conjugate transposition;

e) for all pairs of matrices in the constellation, every said matrix product has a set of one or more singular values;

f) the constellation is equivalent to a set of matrices normalized such that all columns have unit magnitude; and g) under said normalization, the singular values are all less than 0.8.

14. The method of claim 13, wherein the number of transmission antennas is two or more, and each matrix in the constellation consists of orthonormal columns.

15. The method of claim 8, claim 9, or claim 13, wherein the decision process is a ML receiver.

16. The method of claim 8, claim 9, or claim 13, wherein the decision process is a MAP receiver.

17. The method of claim 1, comprising transmitting a plurality of said baseband signals on the radiofrequency carrier, said transmission carried out over more than one fading interval without sending any training signal.

18. The method of claim 8, wherein the decision process is carried out without knowledge of propagation coefficients.

* * * * *